(12) United States Patent
Son

(10) Patent No.: US 11,860,381 B2
(45) Date of Patent: Jan. 2, 2024

(54) FIVE LENS CAMERA MODULE HAVING SPECIFIED LENS TO IMAGING PLANE DISTANCES

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/110,520

(22) Filed: Feb. 16, 2023

(65) Prior Publication Data

US 2023/0213782 A1 Jul. 6, 2023

Related U.S. Application Data

(63) Continuation of application No. 16/801,488, filed on Feb. 26, 2020, now Pat. No. 11,609,435, which is a
(Continued)

(30) Foreign Application Priority Data

Nov. 23, 2015 (KR) ........................ 10-2015-0164238

(51) Int. Cl.
*G02B 7/08* (2021.01)
*G02B 9/60* (2006.01)
(Continued)

(52) U.S. Cl.
CPC ............. *G02B 27/646* (2013.01); *G02B 7/08* (2013.01); *G02B 9/60* (2013.01); *G02B 13/0045* (2013.01);
(Continued)

(58) Field of Classification Search
CPC ........ G02B 7/08; G02B 9/60; G02B 13/0045; G02B 15/145; G02B 15/1451; G02B 15/145121; G02B 27/646
See application file for complete search history.

(56) References Cited

U.S. PATENT DOCUMENTS 7,126,760 B2 10/2006 Yamada
8,456,758 B1 6/2013 Huang et al.
(Continued)

FOREIGN PATENT DOCUMENTS

CN 1332232 C 8/2007
CN 101782676 A 7/2010
(Continued)

OTHER PUBLICATIONS

Korean Office Action dated Dec. 21, 2016, in counterpart Korean Application No. 10-2015-0164238 (10 pages in English, 6 pages in Korean).
(Continued)

*Primary Examiner* — Ryan S Dunning
(74) *Attorney, Agent, or Firm* — NSIP Law

(57) ABSTRACT

A camera module includes: an optical imaging system including a frontmost lens disposed closest to an object side, a rearmost lens disposed closest to an imaging plane, and at least one middle lens disposed between the frontmost lens and the rearmost lens. An image-side surface of the rearmost lens is concave and an inflection point is formed on the image-side surface of the rearmost lens. 0.2<D/TTL is satisfied, D being a shortest distance between the rearmost lens and the imaging plane, and TTL being a distance from an object-side surface of the frontmost lens to the imaging plane.

16 Claims, 17 Drawing Sheets

Related U.S. Application Data continuation of application No. 15/184,264, filed on Jun. 16, 2016, now Pat. No. 10,613,343.

(51) Int. Cl.
  *G02B 13/00* (2006.01)
  *G02B 15/14* (2006.01)
  *G02B 27/64* (2006.01)

(52) U.S. Cl.
  CPC ........ *G02B 15/145* (2019.08); *G02B 15/1451* (2019.08); *G02B 15/145121* (2019.08)

(56) References Cited

U.S. PATENT DOCUMENTS

| | | |
|---|---|---|
| 8,705,181 B2 | 4/2014 | Hsu et al. |
| 8,879,166 B2 | 11/2014 | Tsai et al. |
| 9,091,801 B2 | 7/2015 | Huang |
| 9,348,117 B1 | 5/2016 | Chang et al. |
| 9,798,116 B2 | 10/2017 | Hashimoto |
| 10,613,343 B2 | 4/2020 | Son |
| 2006/0072200 A1 | 4/2006 | Yamada |
| 2011/0134305 A1 | 6/2011 | Sano et al. |
| 2012/0087019 A1 | 4/2012 | Tang et al. |
| 2013/0033762 A1 | 2/2013 | Tsai et al. |
| 2013/0107375 A1 | 5/2013 | Huang et al. |
| 2013/0176631 A1 | 7/2013 | Tsai et al. |
| 2013/0182336 A1 | 7/2013 | Hsu et al. |
| 2013/0329292 A1 | 12/2013 | Wu |
| 2014/0313596 A1 | 10/2014 | Hashimoto |
| 2015/0085385 A1 | 3/2015 | Tanaka et al. |
| 2015/0103414 A1 | 4/2015 | Baik |
| 2015/0168695 A1 | 6/2015 | Tsai et al. |
| 2015/0177483 A1 | 6/2015 | You |
| 2015/0185436 A1 | 7/2015 | Park |
| 2015/0185445 A1 | 7/2015 | Ahn et al. |
| 2015/0241660 A1 | 8/2015 | Son |
| 2015/0241661 A1 | 8/2015 | Shih et al. |
| 2015/0260951 A1 | 9/2015 | Yu |
| 2015/0301314 A1 | 10/2015 | Chen et al. |
| 2015/0323765 A1 | 11/2015 | Hashimoto |
| 2016/0223792 A1 | 8/2016 | Tang et al. |
| 2016/0238817 A1 | 8/2016 | Liu et al. |
| 2017/0023775 A1 | 1/2017 | Shigemitsu |
| 2017/0031134 A1 | 2/2017 | Liu et al. |
| 2017/0052346 A1 | 2/2017 | Tang et al. |
| 2017/0082835 A1 | 3/2017 | Tang et al. |
| 2017/0285303 A1 | 10/2017 | Lai et al. |

FOREIGN PATENT DOCUMENTS

| | | |
|---|---|---|
| CN | 202494826 U | 10/2012 |
| CN | 202583582 U | 12/2012 |
| CN | 103076665 A | 5/2013 |
| CN | 103389568 A | 11/2013 |
| CN | 103777323 A | 5/2014 |
| CN | 103837962 A | 6/2014 |
| CN | 104749751 A | 7/2015 |
| CN | 104765129 A | 7/2015 |
| CN | 204536635 U | 8/2015 |
| CN | 104880804 A | 9/2015 |
| CN | 104914559 A | 9/2015 |
| JP | 2014-178623 A | 9/2014 |
| JP | 2014-211586 A | 11/2014 |
| JP | 2015-60170 A | 3/2015 |
| KR | 10-2005-0035541 A | 4/2005 |
| KR | 10-2010-0001525 A | 1/2010 |
| KR | 10-2015-0043186 A | 4/2015 |
| KR | 10-2015-0072154 A | 6/2015 |
| TW | 201215942 A1 | 4/2012 |
| TW | 201534961 A | 9/2015 |

OTHER PUBLICATIONS

Taiwanese Office Action dated May 8, 2017 in corresponding Taiwanese Patent Application No. 105119358 (5 pages in English and 5 pages in Taiwanese).

Korean Office Action dated Aug. 28, 2017 in corresponding Korean Patent Application No. 10-2015-0164238 (7 pages in English and 4 pages in Korean).

Chinese Office Action dated Nov. 22, 2018 in Chinese Patent Application No. 201610536779.8 (7 pages in English, 7 pages in Chinese).

Chinese Office Action dated Jun. 11, 2019 in corresponding Chinese Patent Application No. 201610536779.8 (14 pages in English, 9 pages in Chinese).

Chinese Office Action dated Mar. 24, 2021 in counterpart Chinese Patent Application No. 201911125342.5 (10 pages in English and 11 pages in Chinese).

Korean Office Action dated May 3, 2021, in Counterpart Korean Application No. 10-2018- 0015684 (6 pages in English and 4 pages in Korean).

Notice of Reason for Rejection dated Oct. 27, 2021, in counterpart Korean Patent Application No. 10-2021-0134900 (6 pages in English and 4 pages in Korean).

Korean Office Action dated Jul. 26, 2022, in counterpart Korean Patent Application No. 10-2022-0083559 (6 pages in English and 4 pages in Korean).

| FIRST EMBODIMENT | | | | | |
|---|---|---|---|---|---|
| F number = 2.07 | | FOV = 79.20 | f = 3.6965 | | |
| SURFACE NO. | | RADIUS OF CURVATURE | THICKNESS /DISTANCE | REFRACTIVE INDEX | ABBE NUMBER | EFFECTIVE RADIUS |
| S1 | FIRST LENS | 1.3232 | 0.6132 | 1.547 | 56.1 | 0.910 |
| S2 | | −34.7120 | 0.0300 | | | 0.818 |
| S3 | SECOND LENS | 23.0033 | 0.2200 | 1.646 | 23.5 | 0.786 |
| S4 | | 2.4309 | 0.1549 | | | 0.685 |
| S5 | STOP | infinity | 0.1747 | | | 0.685 |
| S6 | THIRD LENS | −8.6336 | 0.3473 | 1.547 | 56.1 | 0.781 |
| S7 | | −4.5615 | 0.5686 | | | 0.944 |
| S8 | FOURTH LENS | −6.4191 | 0.4697 | 1.646 | 23.5 | 1.390 |
| S9 | | 260.7427 | 0.0311 | | | 1.743 |
| S10 | FIFTH LENS | 1.2864 | 0.5173 | 1.537 | 55.7 | 2.125 |
| S11 | | 1.1273 | 0.1932 | | | 2.306 |
| S12 | FILTER | infinity | 0.2100 | 1.517 | 64.1 | 2.664 |
| S13 | | infinity | 0.6669 | | | 2.734 |
| S14 | IMAGING PLANE | infinity | 0.0031 | | | 3.133 |

FIG. 4

| SURFACE NO. | S1 | S2 | S3 | S4 | S6 | S7 | S8 | S9 | S10 | S11 |
|---|---|---|---|---|---|---|---|---|---|---|
| K | -0.11588 | 1.00000 | 1.09989 | 1.00000 | -0.99714 | -7.84977 | -0.32665 | 49.13244 | -1.84438 | -0.98258 |
| A | -0.00755 | 0.09193 | 0.09733 | 0.03598 | -0.10300 | -0.07538 | 0.26825 | -0.06589 | -0.67276 | -0.50636 |
| B | 0.14718 | 0.15026 | 0.03622 | 0.04037 | -0.07578 | -0.18260 | -0.78284 | -0.09191 | 0.48777 | 0.37581 |
| C | -0.75867 | -1.36106 | -0.63554 | 0.04037 | 0.10300 | 0.50892 | 1.10180 | 0.22507 | -0.21342 | -0.21981 |
| D | 2.29236 | 3.94147 | 1.92738 | 0.04037 | 0.10300 | -0.79504 | -0.98018 | -0.22529 | 0.06262 | 0.08767 |
| E | -3.80381 | -5.64075 | -2.61375 | 0.04037 | 0.10300 | 0.86301 | 0.43060 | 0.10728 | -0.01182 | -0.02215 |
| F | 3.26870 | 3.75244 | 1.38909 | 0.01503 | -0.02219 | -0.30976 | -0.06918 | -0.02416 | 0.00128 | 0.00332 |
| G | -1.13893 | -0.93217 | -0.19956 | -0.04036 | -0.10300 | -0.00687 | -0.00032 | 0.00207 | -0.00006 | -0.00026 |
| H | | | | | | | | | | 0.00000849 |

FIG. 5

| SECOND EMBODIMENT ||||||
|---|---|---|---|---|---|
| F number = 2.10 | FOV = | 78.00 | f = | 3.7577 ||
| SURFACE NO. | | RADIUS OF CURVATURE | THICKNESS /DISTANCE | REFRACTIVE INDEX | ABBE NUMBER | EFFECTIVE RADIUS |
| S1 | FIRST LENS | 1.2845 | 0.6268 | 1.547 | 56.1 | 0.910 |
| S2 | | 118.6107 | 0.0300 | | | 0.818 |
| S3 | SECOND LENS | 51.2246 | 0.2400 | 1.646 | 23.5 | 0.786 |
| S4 | | 2.7910 | 0.1479 | | | 0.685 |
| S5 | STOP | infinity | 0.1980 | | | 0.685 |
| S6 | THIRD LENS | -6.5985 | 0.3213 | 1.547 | 56.1 | 0.781 |
| S7 | | -4.6685 | 0.5506 | | | 0.944 |
| S8 | FOURTH LENS | -6.5069 | 0.4370 | 1.646 | 23.5 | 1.390 |
| S9 | | 67.1220 | 0.0300 | | | 1.743 |
| S10 | FIFTH LENS | 1.3588 | 0.5489 | 1.537 | 55.7 | 2.125 |
| S11 | | 1.2072 | 0.1792 | | | 2.306 |
| S12 | FILTER | infinity | 0.2100 | 1.517 | 64.1 | 2.664 |
| S13 | | infinity | 0.6754 | | | 2.734 |
| S14 | IMAGING PLANE | infinity | 0.0050 | | | 3.133 |

FIG. 9

| SURFACE NO. | S1 | S2 | S3 | S4 | S6 | S7 | S8 | S9 | S10 | S11 |
|---|---|---|---|---|---|---|---|---|---|---|
| K | -0.17516 | 3.43084 | 0.77152 | 0.98055 | -0.99714 | -8.42144 | -0.29972 | -3.29881 | -1.45209 | -1.08608 |
| A | -0.00510 | -0.00083 | 0.00252 | 0.05164 | -0.12999 | -0.09015 | 0.27222 | -0.13327 | -0.74701 | -0.46510 |
| B | 0.17770 | 0.08852 | 0.32170 | 0.05290 | -0.10754 | -0.18657 | -0.79243 | 0.03183 | 0.56478 | 0.33873 |
| C | -0.92902 | 0.32438 | -1.24444 | 0.05232 | 0.12915 | 0.37621 | 1.14226 | 0.10457 | -0.24298 | -0.19181 |
| D | 2.80578 | -2.83330 | 3.02133 | 0.06469 | 0.06101 | -0.18839 | -1.08368 | -0.16655 | 0.06658 | 0.07599 |
| E | -4.66453 | 7.35372 | -4.01905 | 0.05012 | 0.09514 | -0.30872 | 0.53409 | 0.09607 | -0.01147 | -0.01957 |
| F | 4.01116 | -8.55593 | 2.58710 | 0.03102 | 0.02906 | 0.79000 | -0.11299 | -0.02450 | 0.00113 | 0.00305 |
| G | -1.40445 | 3.68856 | -0.64008 | -0.01894 | -0.12932 | -0.41286 | 0.00635 | 0.00232 | -0.00005 | -0.00026 |
| H | | | | | | | | | | 0.00000889 |

FIG. 10

| THIRD EMBODIMENT ||||||
|---|---|---|---|---|---|
| F number = 2.90 | FOV = | 78.00 | f = | 3.7341 ||
| SURFACE NO. | | RADIUS OF CURVATURE | THICKNESS /DISTANCE | REFRACTIVE INDEX | ABBE NUMBER | EFFECTIVE RADIUS |
| S1 | FIRST LENS | 1.2845 | 0.6268 | 1.547 | 56.1 | 0.920 |
| S2 | | 118.6107 | 0.0300 | | | 0.934 |
| S3 | SECOND LENS | 51.2246 | 0.2400 | 1.646 | 23.5 | 0.909 |
| S4 | | 2.7910 | 0.1479 | | | 0.680 |
| S5 | STOP | infinity | 0.1980 | | | 0.680 |
| S6 | THIRD LENS | −6.5985 | 0.3213 | 1.547 | 56.1 | 0.809 |
| S7 | | −4.6685 | 0.5506 | | | 0.845 |
| S8 | FOURTH LENS | −6.5069 | 0.4370 | 1.646 | 23.5 | 1.374 |
| S9 | | 67.1220 | 0.0300 | | | 1.609 |
| S10 | FIFTH LENS | 1.3588 | 0.5489 | 1.537 | 55.7 | 2.025 |
| S11 | | 1.2072 | 0.1792 | | | 2.256 |
| S12 | FILTER | infinity | 0.2100 | 1.517 | 64.1 | 2.598 |
| S13 | | infinity | 0.6754 | | | 2.678 |
| S14 | IMAGING PLANE | infinity | 0.0050 | | | 3.120 |

FIG. 14

| SURFACE NO. | S1 | S2 | S3 | S4 | S6 | S7 | S8 | S9 | S10 | S11 |
|---|---|---|---|---|---|---|---|---|---|---|
| K | -0.22562 | -2.16009 | 1.68376 | 0.98682 | -1.00000 | -8.53628 | -0.30281 | -3.32962 | -1.40825 | -1.00235 |
| A | 0.00082 | -0.02908 | -0.02692 | 0.04363 | -0.15923 | -0.11849 | 0.22513 | -0.10298 | -0.67187 | -0.44491 |
| B | 0.14042 | -0.11336 | 0.21922 | -0.11179 | -0.20875 | -0.09643 | -0.69341 | -0.02211 | 0.47694 | 0.31774 |
| C | -0.77546 | 1.46476 | -0.42888 | 2.45346 | 1.00478 | 0.07722 | 0.99401 | 0.15158 | -0.18981 | -0.18036 |
| D | 2.46381 | -5.86234 | 0.72398 | -13.22700 | -3.09495 | 0.56664 | -0.92586 | -0.18020 | 0.04733 | 0.07101 |
| E | -4.32213 | 11.50606 | -0.77125 | 38.21509 | 5.82090 | -1.52861 | 0.42784 | 0.09278 | -0.00733 | -0.01796 |
| F | 3.91348 | -11.28806 | 0.39402 | -55.30340 | -4.69230 | 1.96139 | -0.07535 | -0.02203 | 0.00065 | 0.00273 |
| G | -1.45999 | 4.33207 | -0.07828 | 32.10834 | 1.25341 | -0.89039 | 0.00110 | 0.00198 | -0.00002 | -0.00022 |
| H | | | | | | | | | | 0.00000757 |

FIG. 15

FIVE LENS CAMERA MODULE HAVING SPECIFIED LENS TO IMAGING PLANE DISTANCES

CROSS-REFERENCE TO RELATED APPLICATIONS

This application is a continuation of U.S. patent application Ser. No. 16/801,488 filed on Feb. 26, 2020, which is a continuation of U.S. patent application Ser. No. 15/184,264 filed on Jun. 16, 2016, now U.S. Pat. No. 10,613,343, which claims the benefit under 35 USC 119(a) of Korean Patent Application No. 10-2015-0164238 filed on Nov. 23, 2015, in the Korean Intellectual Property Office, the entire disclosures of which are incorporated herein by reference for all purposes.

BACKGROUND

1. Field

The following description relates to a camera module having a hand-shake compensation function.

2. Description of Related Art

Functions of a camera module for a portable terminal have been gradually improved. For example, the camera module includes an optical imaging system composed of multiple lenses in order to capture high resolution images. In addition, the camera module includes a hand-shake compensation unit that is operable to prevent an image quality deterioration phenomenon due to vibrations.

Camera modules have been gradually miniaturized in accordance with the thinning of portable terminals. However, the miniaturization of optical imaging systems may cause problems such as a decrease in available mounting space in the hand-shake compensation unit, and a decrease in movement space of the optical imaging system by the hand-shake compensation unit.

Therefore, a camera module capable of being miniaturized and allowing sufficient space for a hand-shake compensation unit to be secured therein is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a camera module includes: an optical imaging system including a frontmost lens disposed closest to an object side, a rearmost lens disposed closest to an imaging plane, and at least one middle lens disposed between the frontmost lens and the rearmost lens. An image-side surface of the rearmost lens is concave and an inflection point is formed on the image-side surface of the rearmost lens. $0.2 < D/TTL$ is satisfied, D being a shortest distance between the rearmost lens and the imaging plane, and TTL being a distance from an object-side surface of the frontmost lens to the imaging plane.

The at least one middle lens may include three lenses.

The camera module may further include a hand-shake compensation unit configured to move the optical imaging system in a direction intersecting an optical axis of the optical imaging system.

The camera module may further include an auto-focusing unit configured to move the optical imaging system in an optical axis direction of the optical imaging system.

D may be greater than 0.9 mm.

$TTL/ImgH < 0.7$ may be satisfied, ImgH being a diagonal length of the imaging plane.

75 degrees $<$ FOV may be satisfied, FOV being a field of view of the optical imaging system.

According to another general aspect, a camera module includes: an optical imaging system including lenses, each of the lenses having a refractive power; and an imaging plane on which an image of light refracted by the optical imaging system is formed. $0.8\ mm < D$ is satisfied, where D is a shortest distance between an image-side surface of a fifth lens of the lenses and the imaging plane. $TTL/ImgH < 0.7$ is satisfied, where TTL is a distance from an object-side surface of a first lens of the lenses to the imaging plane, and ImgH is a diagonal length of the imaging plane. The first lens is closest to the object side and the fifth lens is closest to the imaging plane.

The lenses comprise the first lens comprises a positive refractive power, a second lens having a negative refractive power, a third lens having a positive refractive power, a fourth lens having a negative refractive power, and the fifth lens having a positive refractive power, the first to fifth lenses being sequentially disposed from an object side to the imaging plane.

The object-side surface of the first lens may be convex.

An object-side surface of the third lens may be concave.

An object-side surface of the fourth lens and an image-side surface of the fourth lens may be concave.

The image-side surface of the fifth lens may be concave and an inflection point may be formed on the image-side surface of the fifth lens.

$0.24 < D/f$ may be satisfied, f being an overall focal length of the optical imaging system.

$TTL < 4.25\ mm$ may be satisfied.

An F number of the optical imaging system may be 2.10 or less.

$TTL/ImgH < 0.68$ may be satisfied.

According to another general aspect, a camera module includes: an optical imaging system including a frontmost lens having a positive refractive power, a rearmost lens having a positive refractive power, and middle lenses disposed between the frontmost lens and the rearmost lens; and an imaging plane on which an image of light refracted by the optical imaging system is formed, the imaging plane being positioned rearward of the rearmost lens. TTL/ImgH is less than 0.7, TTL being a distance from an object-side surface of the frontmost lens to the imaging plane, and ImgH being a diagonal length of the imaging plane. D/f is greater than 0.24, D being a shortest distance between an image-side surface of the rearmost lens and the imaging plane, and f being an overall focal length of the optical imaging system.

The middle lenses may include three lenses. One or more of the three lenses may have negative refractive power.

D/TTL may be greater than 0.2.

D may be greater than 0.8 mm.

According to another general aspect, a camera module includes: an optical imaging system including a first lens positioned closest to an object side of the optical image system, and a last lens positioned closest to an image side of the optical imaging system; and an imaging plane on which an image of light refracted by the optical imaging system is formed. D/f is greater than 0.24, D being a shortest distance between an image-side surface of the last lens and the imaging plane, and f being an overall focal length of the optical imaging system. TTL is less than 4.25 mm, TTL being a distance from an object-side surface of the first lens to the imaging plane.

The optical imaging system may further include: a second lens having a negative refractive power; a third lens having a positive refractive power; and a fourth lens having a negative refractive power, wherein the first lens, the second lens, the third lens, the fourth lens and the last lens are sequentially arranged from the object side to the imaging plane.

The image-side surface of the last lens may be concave and may include an inflection point.

The object-side surface of the first lens may be convex. An object-side surface of the second lens may be convex. An object-side surface of the third lens may be concave. An image-side surface and an object-side surface of the fourth lens may be concave.

Other features and aspects will be apparent from the following detailed description, the drawings, and the claims.

BRIEF DESCRIPTION OF DRAWINGS

FIG. 4 is a table illustrating respective characteristics of lenses of the optical imaging system illustrated in FIG. 1, according to an embodiment.

FIG. 5 is a table illustrating respective aspherical surface coefficients of lenses of the optical imaging system illustrated in FIG. 1, according to an embodiment.

FIG. 9 is a table illustrating respective characteristics of lenses of the optical imaging system illustrated in FIG. 6, according to an embodiment.

FIG. 10 is a table illustrating respective aspherical surface coefficients of lenses of the optical imaging system illustrated in FIG. 6, according to an embodiment.

FIG. 14 is a table illustrating respective characteristics of lenses of the optical imaging system illustrated in FIG. 11, according to an embodiment.

FIG. 15 is a table illustrating respective aspherical surface coefficients of lenses of the optical imaging system illustrated in FIG. 11, according to an embodiment.

DETAILED DESCRIPTION

Figure 1:
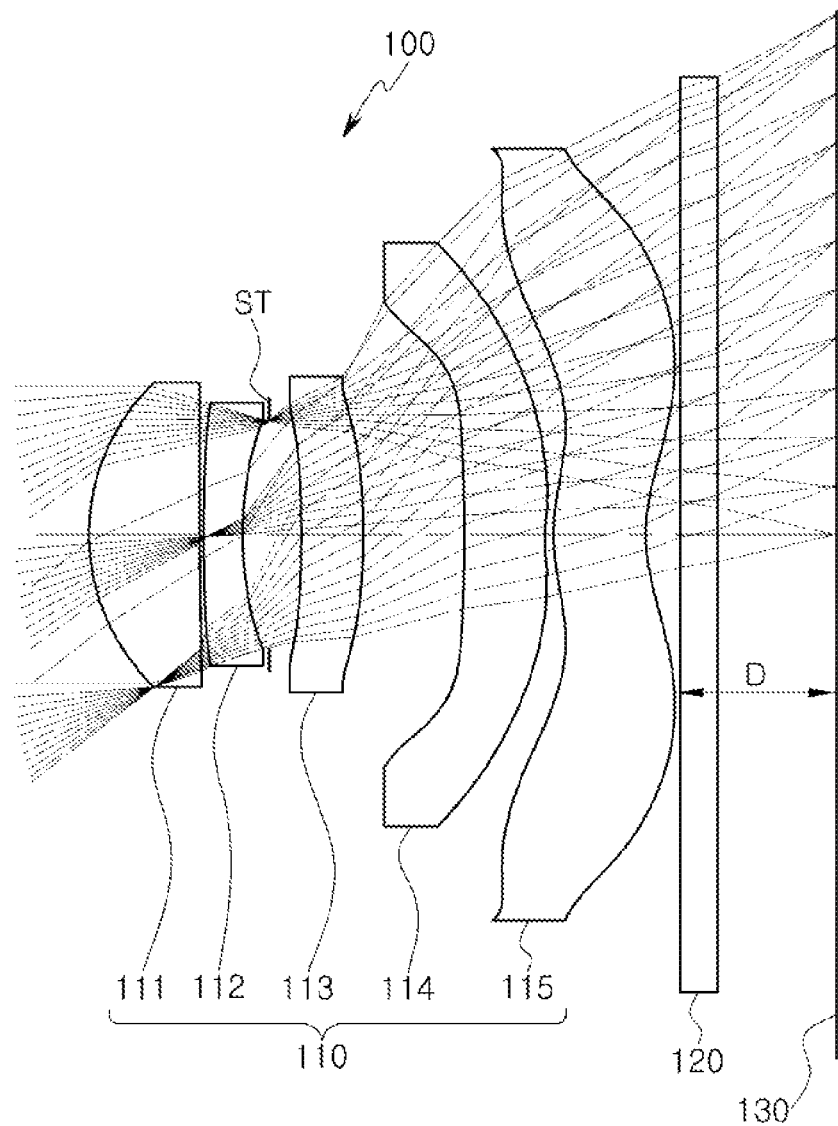
FIG. 1 is a view of an optical imaging system of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the disclosed embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the inventive concept. As used herein, the singular forms "a,"

"an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views illustrating the embodiments. In the drawings, for example, due to manufacturing techniques and/or tolerances, modifications of the shape shown may be estimated. Thus, the disclosed embodiments should not be construed as being limited to the particular shapes of regions shown herein, for example, to include a change in shape results in manufacturing. The following embodiments may also be constituted by one or a combination thereof.

In addition, it is to be noted that in the following description, a first lens refers to a lens that is the closest to an object (or a subject) and a fifth lens refers to a lens that is the closest to an imaging plane (or an image sensor). In the following description, all numerical values of radii of curvature, thicknesses, TTL, ImgH (a diagonal length of the imaging plane), and focal lengths of lenses are indicated in millimeters (mm). Further, thicknesses of the lenses, intervals between the lenses, and the TTL are distances along an optical axis of the lens. Further, in descriptions of lens shapes, the meaning of one surface of the lens being convex is that an optical axis portion (i.e., a paraxial region) of the corresponding surface is convex, and the meaning of one surface of the lens being concave is that an optical axis portion of the corresponding surface is concave. Therefore, even in the case that it is described that one surface of the lens is convex, an edge portion of the lens may be concave. Likewise, even in the case that it is described that one surface of the lens is concave, an edge portion of the lens may be convex.

Further, in the present specification, an object-side surface of the lens refers to a surface of the corresponding lens closest to the object, and an image-side surface of the lens refers to a surface of the corresponding lens closest to the imaging plane.

An optical imaging system may include a plurality of lenses. For example, the optical imaging system may include five lenses. The first to fifth lenses configuring the optical imaging system may be sequentially disposed in a direction from the object side toward the imaging plane. For example, the first lens may be a lens closest to the object side, and the fifth lens may be a lens closest to the imaging plane.

Next, five lenses configuring the optical imaging system will be described in detail.

The first lens may, for example, have a positive refractive power.

At least one surface of the first lens may be convex. For example, an object-side surface of the first lens is convex.

The first lens may have an aspherical surface. For example, the object-side surface and an image-side surface of the first lens are aspherical. The first lens may be formed of a material having high light transmittance and excellent workability. For example, the first lens may be formed of plastic. However, a material of the first lens is not limited to plastic. For example, the first lens may also be formed of glass.

The second lens may, for example, have a negative refractive power.

The second lens may have a meniscus shape. For example, an image-side surface of the second lens is concave.

The second lens may have an aspherical surface. For example, the image-side surface of the second lens is aspherical. The second lens may be formed of a material having high light transmittance and excellent workability. For example, the second lens is formed of plastic or a polyurethane material. However, a material of the second lens is not limited to plastic. For example, the second lens may also be formed of glass.

The second lens may be formed of a material having a high refractive index. For example, the refractive index of the second lens may be 1.60 or more. The second lens may further have a low Abbe number. For example, the Abbe number of the second lens may be 30 or less. The second lens as described above may decrease chromatic aberrations of the first lens.

The third lens may, for example, have a positive refractive power.

The third lens may have a meniscus shape. For example, an object-side surface of the third lens may be concave.

The third lens may have an aspherical surface. For example, the object-side surface and an image-side surface of the third lens are aspherical. The third lens may be formed of a material having high light transmittance and excellent workability. For example, the third lens may be formed of plastic or a polyurethane material. However, a material of the third lens is not limited to plastic. For example, the third lens may also be formed of glass.

The fourth lens may, for example, have a negative refractive power.

The fourth lens may have a meniscus shape. For example, an object-side surface and an image-side surface of the fourth lens may be concave.

The fourth lens may have an aspherical surface. For example, the object-side surface and the image-side surface of the fourth lens may be aspherical. The fourth lens may be formed of a material having high light transmittance and excellent workability. For example, the fourth lens may be formed of plastic or a polyurethane material. However, a material of the fourth lens is not limited to plastic. For example, the fourth lens may also be formed of glass.

The fourth lens may be formed of a material having a high refractive index. For example, the refractive index of the fourth lens may be 1.60 or more. The fourth lens may further have a low Abbe number. For example, the Abbe number of the fourth lens may be 30 or less.

The fifth lens may, for example, have a positive refractive power.

The fifth lens may have a meniscus shape. For example, an image-side surface of the fifth lens is concave. The fifth lens may also have an inflection point. For example, the inflection point may be formed on the image-side surface of the fifth lens.

The fifth lens may have an aspherical surface. For example, the image-side surface and an object-side surface of the fifth lens are aspherical. The fifth lens may be formed of a material having high light transmittance and excellent workability. For example, the fifth lens may be formed of plastic or a polyurethane material. However, a material of the fifth lens is not limited to plastic. For example, the fifth lens may also be formed of glass.

As indicated above, at least one of the first to fifth lenses may have an aspherical shape. According to an example, among the first to fifth lenses, only the fifth lens may have the aspherical shape. Further, at least one the object-side surface or the image-side surface of the first to fifth lenses may be aspherical. The aspherical surface of each of the lenses may be represented by Equation 1.

$$Z = \frac{cr^2}{1 + \sqrt{1 - (1+k)c^2 r^2}} + Ar^4 + Br^6 +$$
$$Cr^8 + Dr^{10} + Er^{12} + Fr^{14} + Gr^{16} + Hr^{18} + Jr^{20}$$
[Equation 1]

In Equation 1, c is an inverse of a radius of curvature of the corresponding lens, K is a conic constant, r is a distance from a certain point on an aspherical surface to an optical axis, A to J are aspherical constants, and Z is a height from the certain point on the aspherical surface to an apex of the corresponding aspherical surface in an optical axis direction.

The camera module may satisfy the following Conditional Expressions:

| | |
|---|---|
| 0.2<D/TTL | [Conditional Expression 1] |
| 0.8 mm<D | [Conditional Expression 2] |
| 0.9 mm<D | [Conditional Expression 3] |
| TTL/ImgH<0.7 | [Conditional Expression 4] |
| 75 degrees <FOV | [Conditional Expression 5] |
| 0.24<D/f | [Conditional Expression 6] |
| TTL<4.25 mm | [Conditional Expression 7] |
| F No.≤2.1 | [Conditional Expression 8] |

In the preceding Conditional Expressions, D is a shortest distance between an image-side surface of the lens closest to an imaging plane and the imaging plane, TTL is a distance from the an object-side surface of the lens closest to the object to the imaging plane, ImgH is the diagonal length of the imaging plane, FOV is a maximum field of view of the optical imaging system, and f is an overall focal length of the optical imaging system.

The camera module satisfying the above Conditional Expressions is miniaturized to thereby be mounted on a small sized terminal. In addition, the camera module satisfying the above Conditional Expressions may realize high resolution in capturing images. Further, the camera module satisfying the above Conditional Expressions may be sufficiently compact to provide a space between the optical imaging system and the imaging plane that is large enough to enable a hand-shake compensation unit to be mounted in the space.

Hereinafter, optical imaging systems according to several example embodiments will be described.

FIG. 1 illustrates a camera module 100, according to an embodiment. The camera module 100 includes an optical imaging system 110, a filter 120, and an imaging plane 130. The optical imaging system 110 includes a plurality of lenses having refractive power. For example, the optical imaging system 110 includes a first lens 111, a second lens 112, a third lens 113, a fourth lens 114, and a fifth lens 115.

In the camera module 100, the optical imaging system 110 may move in a direction intersecting an optical axis. For example, a shortest distance D from the fifth, rearmost lens 115 of the optical imaging system 110 to the imaging plane 130 may be about 0.8 mm or more. For example, the shortest distance D may be about 0.9 mm or more. The numerical value of D may be a minimum value enabling movement of the optical imaging system 110 while enabling disposition of the filter 130 between the fifth, rearmost lens 115 and the imaging plane 130. For reference, in the embodiment of FIG. 1, the shortest distance D is about 0.908 mm.

The first lens 111 has positive refractive power. An object-side surface of the first lens 111 is convex and an image-side surface of the first lens 111 is convex.

The second lens 112 has negative refractive power. An object-side surface of the second lens 112 is convex and an image-side surface of the second lens 112 is concave.

The third lens 113 has positive refractive power. An object-side surface of the third lens 113 is concave and an image-side surface of the third lens 113 is convex.

The fourth lens 114 has negative refractive power. An object-side surface and an image-side surface of the fourth lens 114 are concave.

The fifth lens 115 has positive refractive power. An object-side surface of the fifth lens 115 is convex and an image-side surface of the fifth lens 115 is concave. The fifth lens 115 may include one or more inflection points on its object-side surface and its image side-surface.

The optical imaging system 110 further include a stop ST that is operable to adjust an amount of light incident in the optical system 110. The stop ST may be disposed between the second and third lenses 112 and 113.

Figure 2:
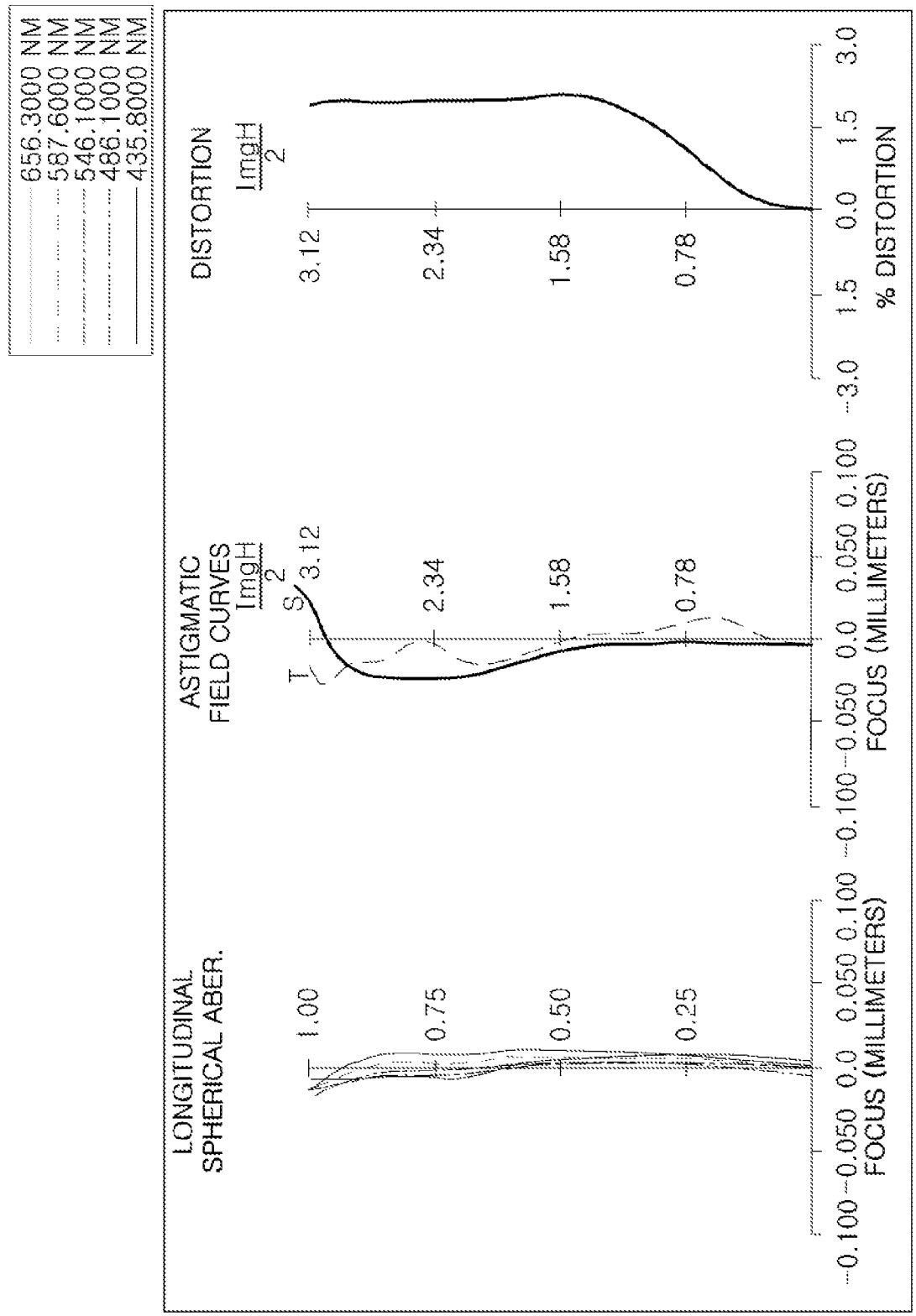
FIG. 2 includes graphs having curves representing aberration characteristics of the optical imaging system illustrated in FIG. 1, according to an embodiment.
Figure 3:
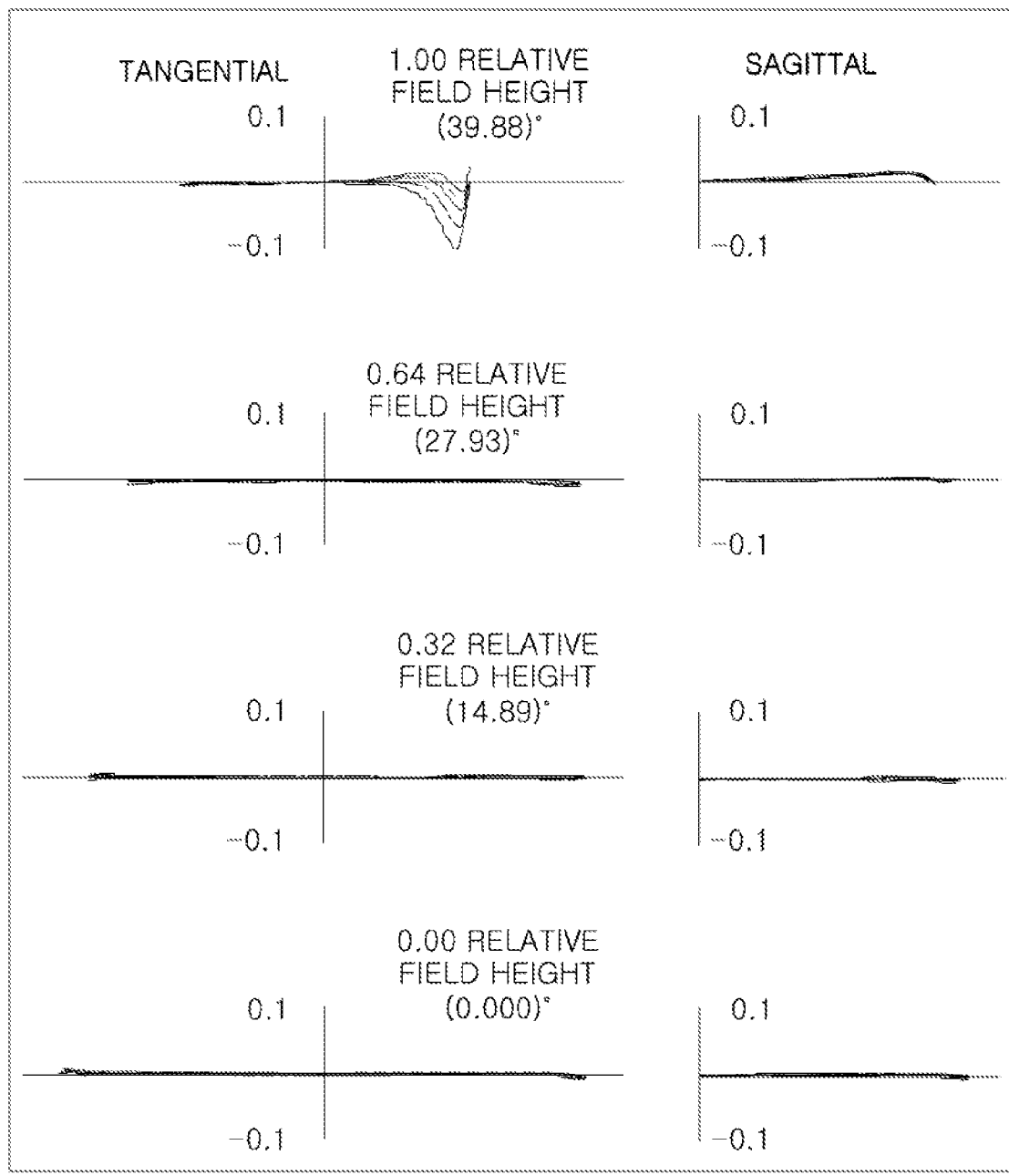
FIG. 3 is a graph representing a modulation transfer function (MTF) of the optical imaging system illustrated in FIG. 1, according to an embodiment.

The optical imaging system 110 as described above may exhibit aberration characteristics and MTF characteristics as illustrated in FIGS. 2 and 3. FIGS. 4 and 5 are tables providing example characteristics of lenses and aspherical characteristics of the optical imaging system 110. In FIGS. 4 and 5 the reference characters S1 through S14 refer to the following surfaces in the optical imaging system 110:

S1 and S2: object-side surface and image-side surface, respectively, of first lens 111

S3 and S4: object-side surface and image-side surface, respectively, of second lens 112

S5: stop ST

S6 and S7: object-side surface and image-side surface, respectively, of third lens 113

S8 and S9: object-side surface and image-side surface, respectively, of fourth lens 114

S10 and S11: object-side surface and image-side surface, respectively, of fifth lens 115

S12 and S13: object-side surface and image-side surface, respectively, of filter 120

S14: imaging plane 130

An effective radius of the optical imaging system 110 may decrease from the first lens 111 toward the stop ST, but may increase from the stop ST toward the imaging plane 130, as illustrated in FIG. 4. A maximum effective radius of the optical imaging system 110 may be about 3.133 mm, greater than ½ of a diagonal length ImgH of the imaging plane 130.

Figure 6:
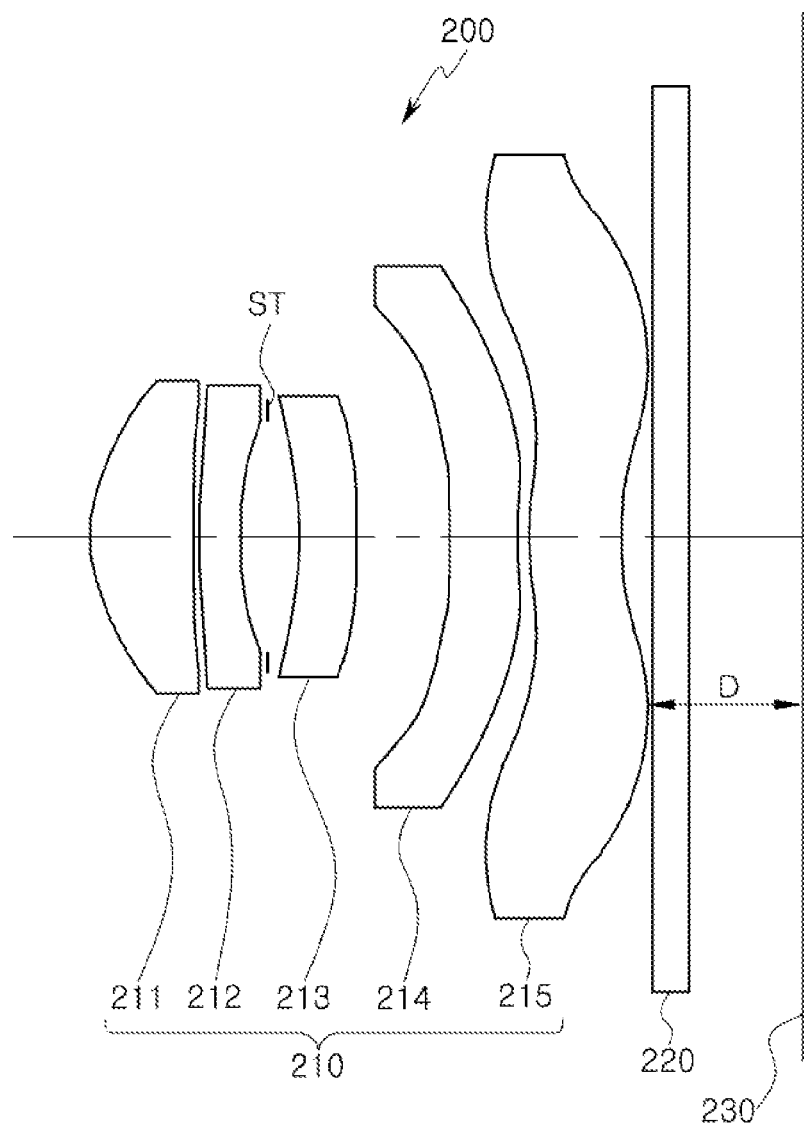
FIG. 6 is a view of an optical imaging system of a camera module, according to another embodiment.

FIG. 6 illustrates a camera module 200, according to another embodiment. The camera module 200 includes an optical imaging system 210, a filter 220, and an imaging plane 230. The optical imaging system 210 includes a plurality of lenses having refractive power. For example, the optical imaging system 210 includes a first lens 211, a second lens 212, a third lens 213, a fourth lens 214, and a fifth lens 215.

In the camera module 200, the optical imaging system 210 may move in a direction intersecting the optical axis. For example, a shortest distance D from the fifth, rearmost lens 215 of the optical imaging system 210 to the imaging plane 230 may be about 0.8 mm or more. For example, the shortest distance D may be about 0.9 mm or more. The numerical value is a minimum value enabling movement of the optical imaging system 210 while enabling disposition of the filter 230 between the fifth, rearmost lens 215 and the imaging plane 230. For reference, in the embodiment of FIG. 6, the shortest distance D is about 0.918 mm.

The first lens 211 has positive refractive power. An object-side surface of the first lens 211 is convex, and an image-side surface of the first lens 211 is concave.

The second lens 212 has negative refractive power. An object-side surface of the second lens 212 is convex, and an image-side surface of the second lens 212 is concave.

The third lens 213 has positive refractive power. An object-side surface of the third lens 213 is concave, and an image-side surface of the third lens 213 is convex.

The fourth lens 214 has negative refractive power. An object-side surface and an image-side surface of the fourth lens 214 are concave.

The fifth lens 215 has positive refractive power. An object-side surface of the fifth lens 215 is convex, and an image-side surface of the fifth lens 215 is concave. The fifth lens 215 may include one or more inflection points on its object-side surface and its image side-surface.

The optical imaging system 210 may further include a stop ST operable to adjust an amount of light incident in the optical imaging system 210. The stop ST may be disposed between the second and third lenses 212 and 213.

Figure 7:
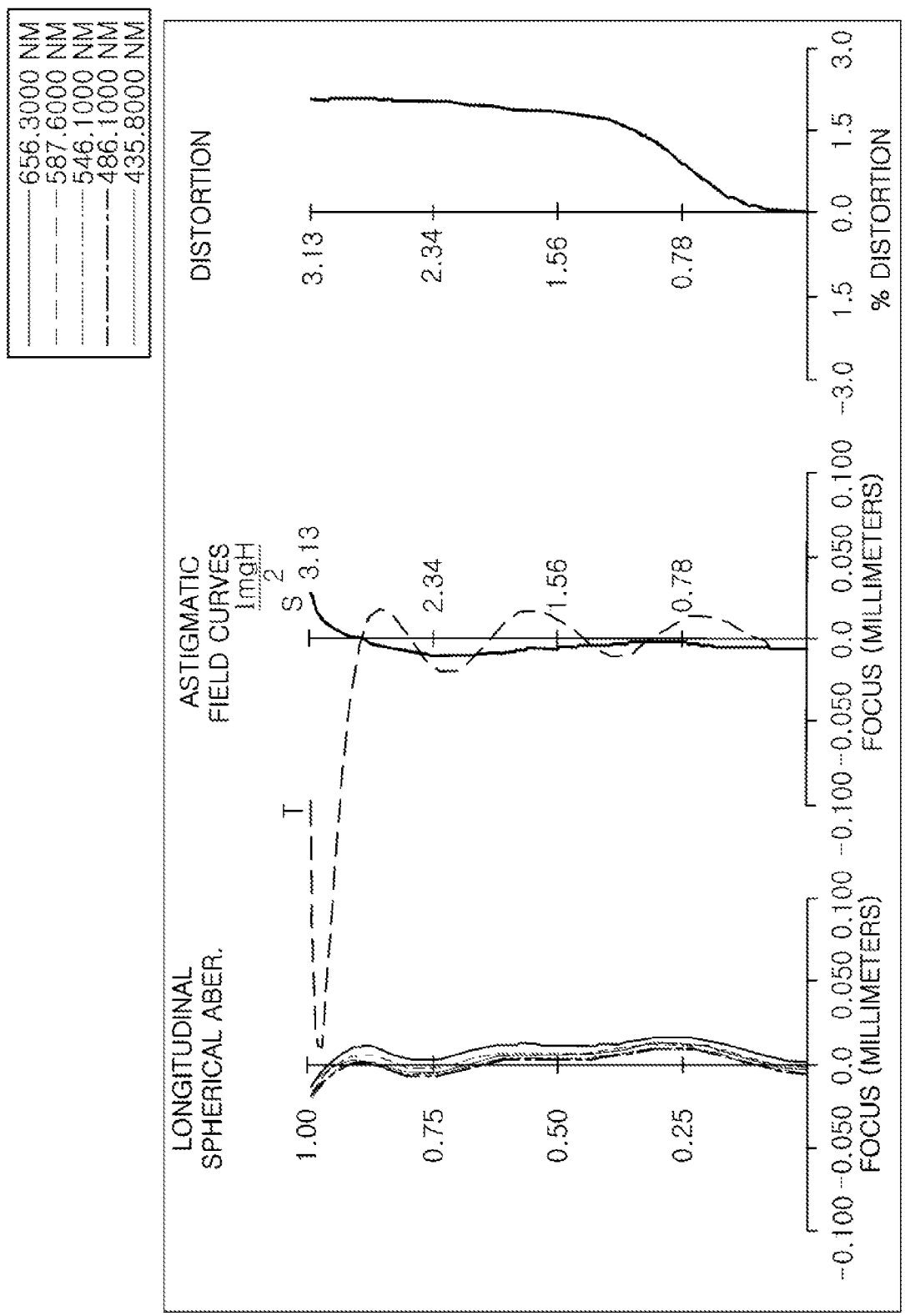
FIG. 7 includes graphs having curves representing aberration characteristics of the optical imaging system illustrated in FIG. 6, according to an embodiment.
Figure 8:
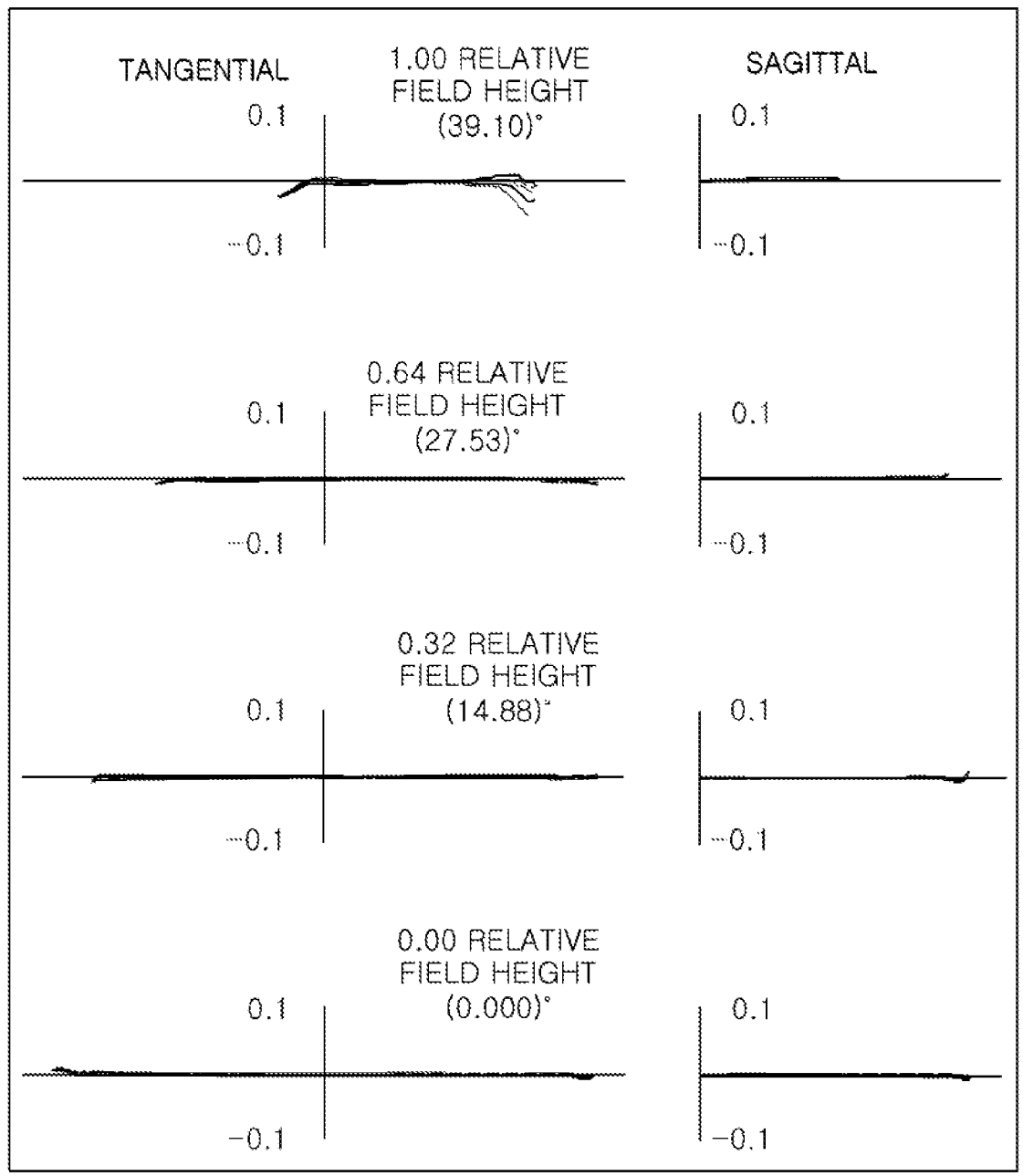
FIG. 8 is a graph representing a modulation transfer function (MTF) of the optical imaging system illustrated in FIG. 6, according to an embodiment.

The optical imaging system 210 as described above may exhibit aberration characteristics and MTF characteristics as illustrated in FIGS. 7 and 8. FIGS. 9 and 10 are tables providing example characteristics of lenses and aspherical characteristics of the optical imaging system 110. The surfaces S1-S14 in FIGS. 9 and 10 correspond to the surfaces S1-S14 in FIGS. 4 and 5.

An effective radius of the optical imaging system 210 may decrease from the first lens 211 toward the stop ST, but may increase from the stop ST toward the imaging plane 230, as illustrated in FIG. 9. A maximum effective radius of the optical imaging system 210 may be about 3.133 mm, greater than ½ of a diagonal length ImgH of the imaging plane 230.

Figure 11:
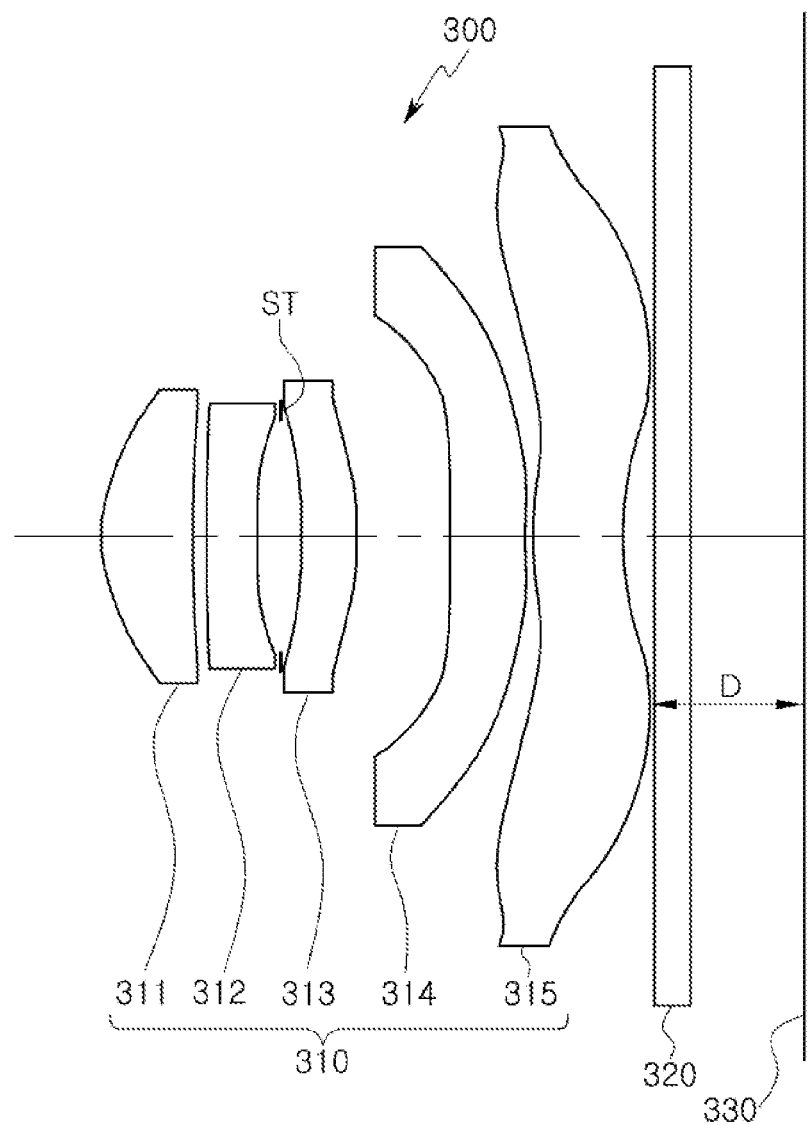
FIG. 11 is a view of an optical imaging system of a camera module, according to another embodiment.

FIG. 11 shows a camera module 300, according to another embodiment. The camera module 300 includes an optical imaging system 310, a filter 320, and an imaging plane 330. The optical imaging system 310 includes a plurality of lenses having refractive power. For example, the optical imaging system 310 includes a first lens 311, a second lens 312, a third lens 313, a fourth lens 314, and a fifth lens 315.

In the camera module 300, the optical imaging system 310 may move a direction intersecting the optical axis. For example, a shortest distance D from the fifth, rearmost lens 315 of the optical imaging system 310 to the imaging plane 330 may be about 0.8 mm or more. For example, the shortest distance D may be about 0.9 mm or more. The numerical value may be a minimum value enabling movement of the optical imaging system 310 while enabling disposition of the filter 330 between the fifth, rearmost lens 315 and the imaging plane 330. For reference, in the embodiment of FIG. 11, the shortest distance D is about 0.919 mm.

The first lens 311 has positive refractive power. An object-side surface of the first lens 311 is convex, and an image-side surface of the first lens 311 is concave.

The second lens 312 has negative refractive power. An object-side surface of the second lens 312 is convex, and an image-side surface of the second lens 312 is concave.

The third lens 313 has positive refractive power. An object-side surface of the third lens 313 is concave, and an image-side surface of the third lens 313 is convex.

The fourth lens 314 has negative refractive power. The object-side surface and the image-side surface of the fourth lens 314 are concave.

The fifth lens 315 has positive refractive power. An object-side surface of the fifth lens 315 is convex, and an image-side surface of the fifth lens 315 is concave. The fifth lens 315 may include one or more inflection points on its object-side surface and its image side-surface.

The optical imaging system 310 may further include a stop ST operable to adjust an amount of light incident in the optical imaging system 310. The stop ST may be disposed between the second and third lenses 312 and 313.

Figure 12:
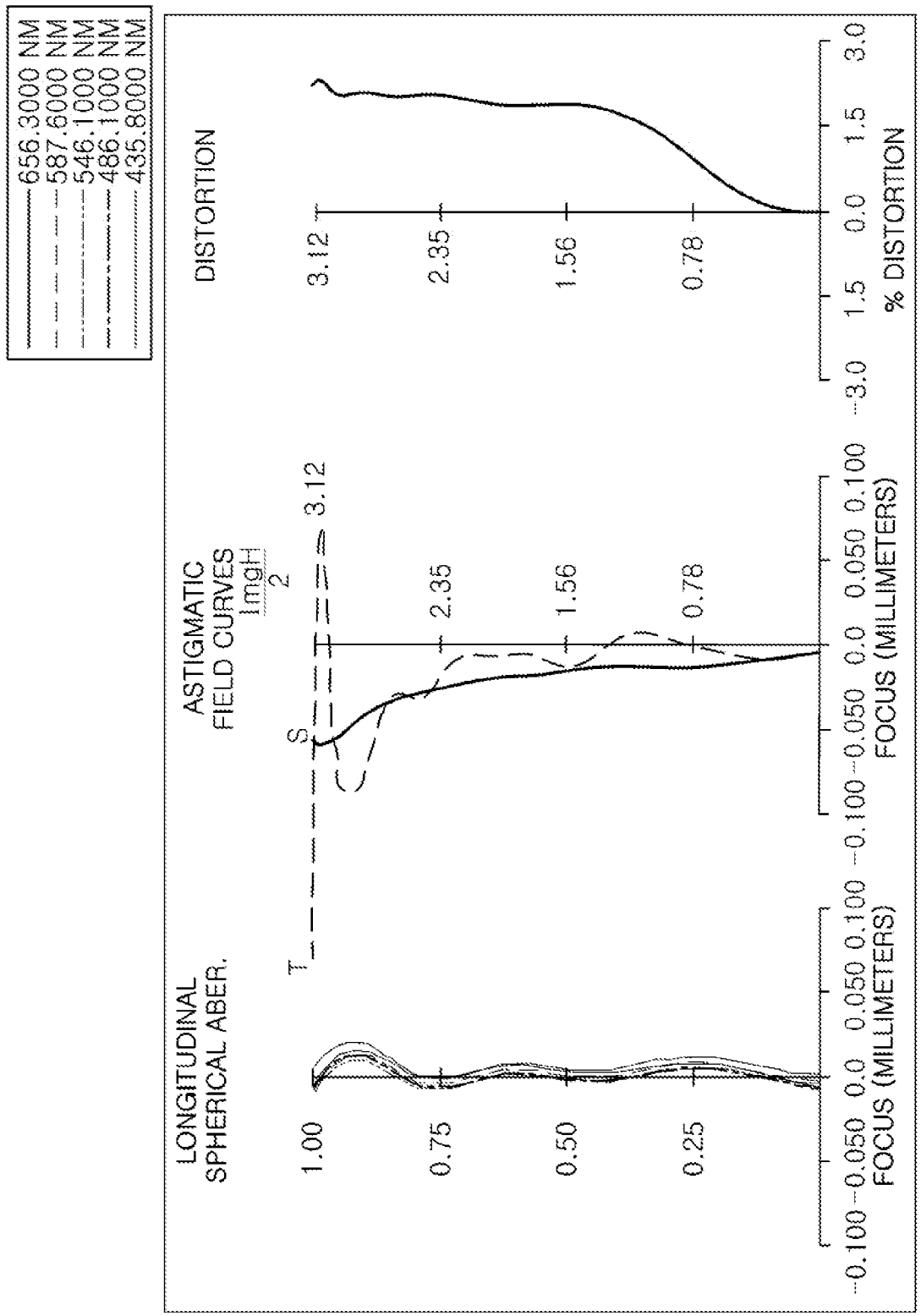
FIG. 12 includes graphs having curves representing aberration characteristics of the optical imaging system illustrated in FIG. 11, according to an embodiment.
Figure 13:
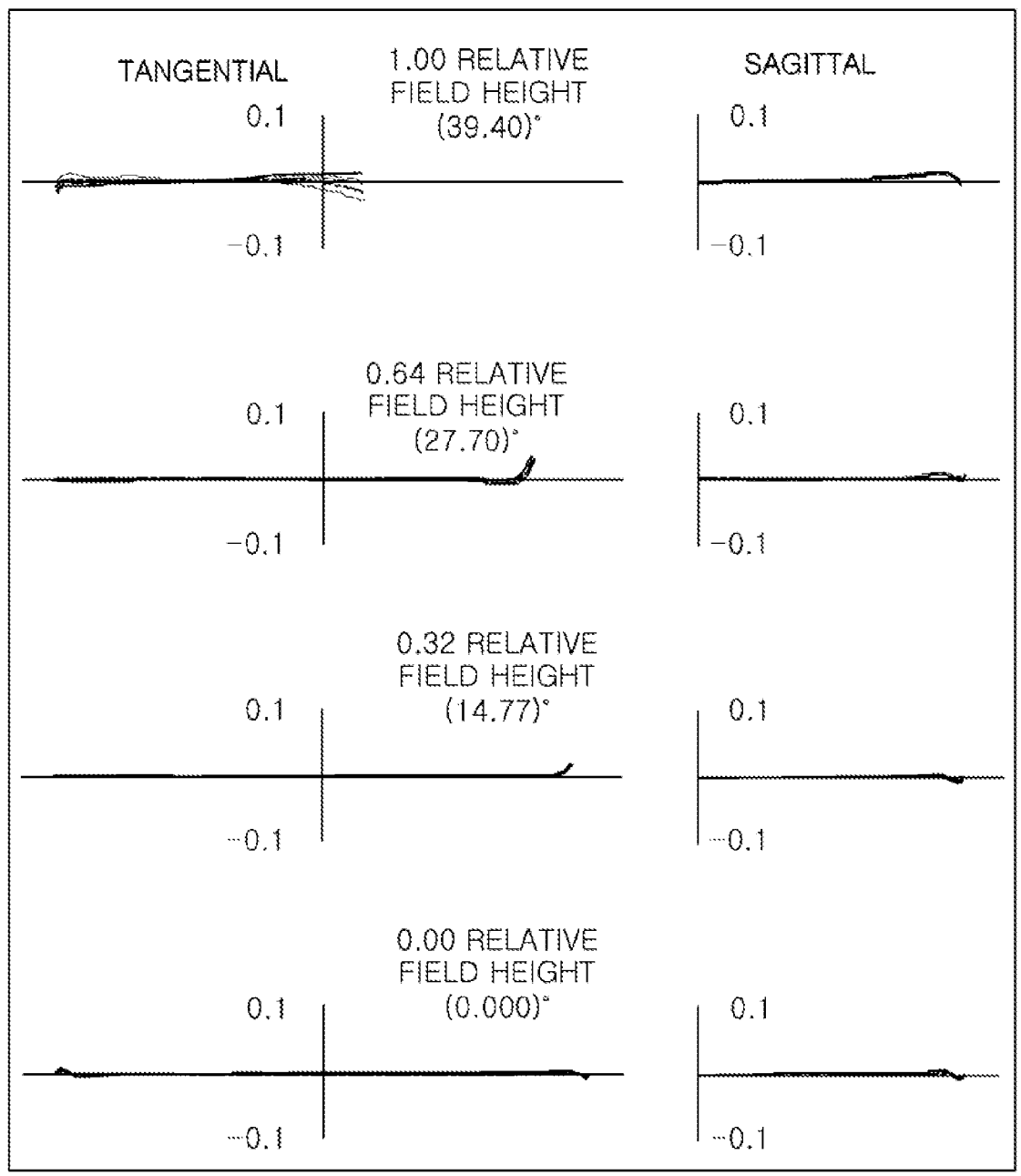
FIG. 13 is a graph representing a modulation transfer function (MTF) of the optical imaging system illustrated in FIG. 11, according to an embodiment.

The optical imaging system 310 as described above may exhibit aberration characteristics and MTF characteristics as illustrated in FIGS. 12 and 13. FIGS. 14 and 15 are tables providing example characteristics of lenses and aspherical characteristics of the optical imaging system 310. The surfaces S1-S14 in FIGS. 14 and 15 correspond to the surfaces S1-S14 in FIGS. 4 and 5.

An effective radius of the optical imaging system 310 may decrease from the first lens 311 toward the stop ST, but may increase from the stop ST toward the imaging plane 330, as illustrated in FIG. 14. A maximum effective radius of the optical imaging system may be about 3.120 mm, equal to ½ of a diagonal length ImgH of the imaging plane 330.

Table 1 includes values of optical characteristics and Conditional Expressions of the optical imaging systems 110, 210 and 310, according to the example embodiments. In Table 1, all lengths are indicated in millimeters (mm). As shown in Table 1, an overall focal length f of the optical imaging system 110/210/310 may be configured within a range of about 3.50 mm to about 3.90 mm. A focal length f1 of the first lens may be configured within a range of about 2.20 mm to about 2.40 mm. A focal length f2 of the second lens may be configured within a range of about −4.70 mm to about −4.10 mm. A focal length f3 of the third lens may be configured within a range of about 16 mm to about 29 mm. A focal length f4 of the fourth lens may be configured within a range of about −11 mm to about −8.0 mm. A focal length f5 of the fifth lens may be configured within a range of about 70 mm to about 130 mm. An overall length of the optical imaging system may be about 4.20 mm or less. A maximum field of view of the optical imaging system may be about 78 mm or more. D may be about 0.8 mm or more. However, it may be more advantageous in mounting a hand-shake compensation unit if D is about 0.9 mm or more. The F No. may be about 2.1 or less. TTL/ImgH may be smaller than about 0.7. However, TTL/ImgH may be smaller than about 0.68, which may be advantageous in miniaturizing the optical imaging system.

TABLE 1

| Remarks | First Embodiment | Second Embodiment | Third Embodiment |
|---|---|---|---|
| f | 3.6965 | 3.7577 | 3.7341 |
| f1 | 2.3464 | 2.3717 | 2.3717 |
| f2 | −4.2246 | −4.5776 | −4.5776 |
| f3 | 17.1792 | 27.5840 | 27.5840 |
| f4 | −9.6898 | −9.1597 | −9.1597 |
| f5 | 125.4764 | 76.3495 | 76.3495 |
| TTL | 4.1969 | 4.1953 | 4.1953 |
| BFL | 1.0730 | 1.0690 | 1.0680 |
| F No. | 2.070 | 2.100 | 2.900 |
| FOV | 79.200 | 78.000 | 78.000 |
| ImgH | 6.240 | 6.240 | 6.240 |
| D | 0.9080 | 0.9190 | 0.9180 |
| D/TTL | 0.2164 | 0.2191 | 0.2188 |
| TTL/ImgH | 0.6726 | 0.6723 | 0.6723 |
| D/f | 0.2456 | 0.2446 | 0.2458 |

Next, a configuration of an actuator of the camera module 100 will be described with reference to FIGS. 16 and 17. It should be understood that the described configuration of the actuator also applies to the camera modules 200 and 300.

Figure 16:
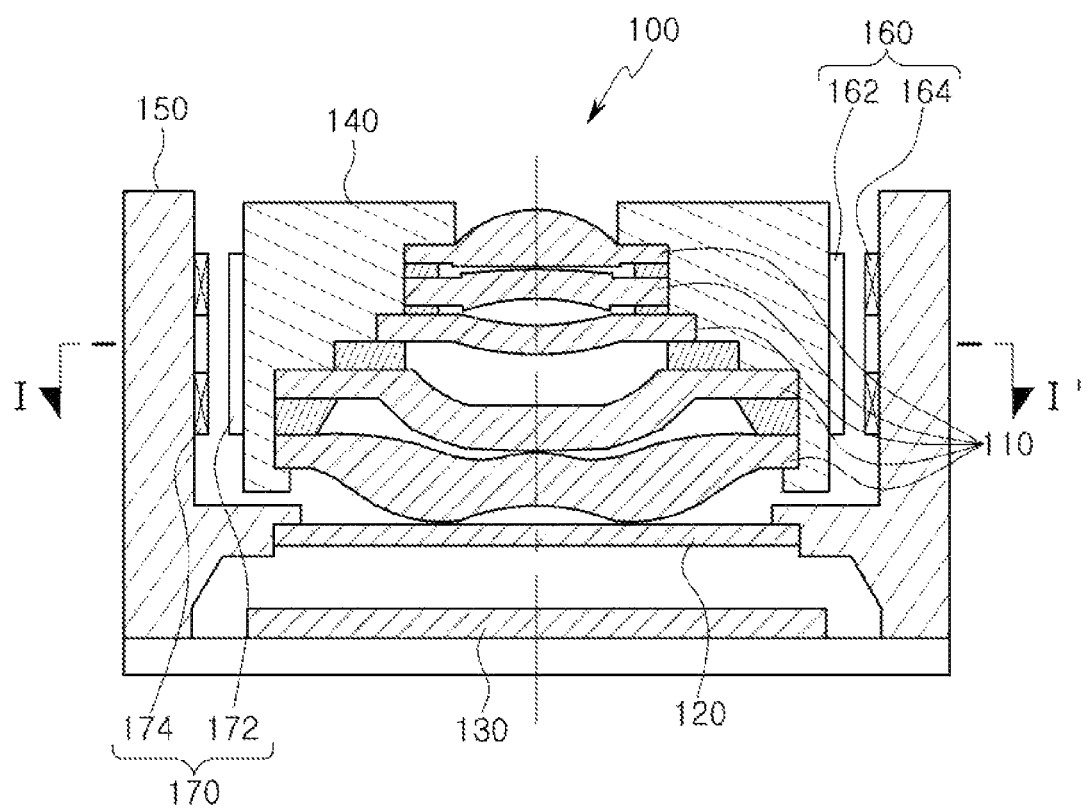
FIG. 16 is a partially enlarged cross-sectional view of the camera module of FIG. 1, according to an embodiment.
Figure 17:
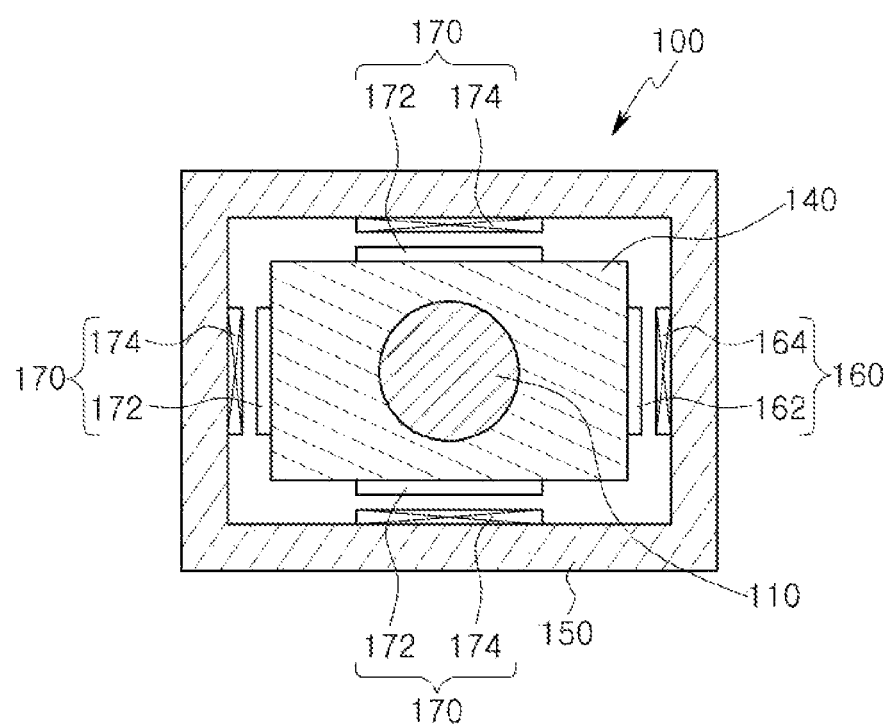
FIG. 17 is a cross-sectional view of the camera module of FIG. 16, taken along line I-I of FIG. 16.

As shown in FIGS. 16 and 17, the camera module 100 includes an actuator operable to move the optical imaging system 110. For example, the camera module 100 includes an auto-focusing unit 160 and a hand-shake compensation unit 170.

The auto-focusing unit 160 is operable to move the optical imaging system 110 in the optical axis direction. To this end, the auto-focusing unit 160 includes a first magnet 162 and a first coil 164. The first magnet 162 is disposed on a lens barrel 140 accommodating the optical imaging system 110 therein, and the first coil 164 is disposed on a housing 150 accommodating the lens barrel 140 therein. The first magnet 162 and the first coil 164 are disposed on one side surface of the lens barrel 140 and one side surface of the housing 150, respectively, to face each other as illustrated in FIG. 17.

The hand-shake compensation unit 170 is operable to move the optical imaging system 110 in the direction intersecting the optical axis. To this end, the hand-shake compensation unit 170 includes a second magnet 172 and a second coil 174. The second magnet 172 is disposed on the lens barrel 140 accommodating the optical imaging system 110 therein, and the second coil 174 is disposed on the housing 150 accommodating the lens barrel 140 therein. In more detail, the second magnet 172 and the second coil 174 are disposed on another side surface of the lens barrel 140 and another side surface of the housing 150, respectively, on which the auto-focusing unit 160 is not disposed, to face each other as illustrated in FIG. 17.

In the camera module 100 as described above, since the overall length of the optical imaging system 110 may be about 4.20 mm or less, the camera module 100 may be miniaturized. Further, since a sufficient space may be provided between the optical imaging system 110 and the imaging plane 130, the auto-focusing unit 160 and the hand-shake compensating unit 170 may be mounted in the space. Therefore, according to the disclosed embodiments, a camera module having high resolution and high performance may be provided.

As set forth above, according to example embodiments disclosed herein, a thin camera module may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
an optical imaging system comprising a first lens, a second lens having a concave image-side surface, a third lens, a fourth lens, and a fifth lens, and
an imaging plane on which an image of light refracted by the optical imaging system is formed,
wherein the first to fifth lens are sequentially disposed from an object side to the imaging plane,
wherein the optical imaging system has a total number of five lenses with refractive power,
wherein 0.8 mm<D is satisfied, where D is a shortest distance between an image-side surface of the fifth lens and the imaging plane, and
wherein TTL/ImgH<0.7 is satisfied, where TTL is a distance from an object-side surface of the first lens to the imaging plane and ImgH is a diagonal length of the imaging plane.

2. The camera module of claim 1, wherein the first lens has a positive refractive power.

3. The camera module of claim 1, wherein the second lens has a negative refractive power.

4. The camera module of claim 1, wherein the third lens has a positive refractive power.

5. The camera module of claim 1, wherein the fourth lens has a negative refractive power.

6. The camera module of claim 1, wherein the fifth lens has a positive refractive power.

7. The camera module of claim 1, wherein the first lens has a convex object-side surface.

8. The camera module of claim 1, wherein the third lens has a concave object-side surface.

9. The camera module of claim 1, wherein the fourth lens has a concave object-side surface.

10. The camera module of claim 1, wherein the fourth lens has a concave image-side surface.

11. The camera module of claim 1, wherein the fifth lens has is a concave image-side surface.

12. The camera module of claim 1, wherein the fifth lens has an inflection point formed on an image-side surface of the fifth lens.

13. The camera module of claim 1, wherein 0.24<D/f is satisfied, f is being overall focal length of the optical imaging system.

14. The camera module of claim 1, wherein TTL<4.25 mm is satisfied.

15. The camera module of claim 1, wherein an F number of the optical imaging system is 2.10 or less.

16. The camera module of claim 1, wherein TTL/ImgH<0.68 is satisfied.

* * * * *